(12) United States Patent
Wang et al.

(10) Patent No.: US 11,238,888 B2
(45) Date of Patent: Feb. 1, 2022

(54) SYSTEM AND METHODS FOR AUTOMATICALLY MIXING AUDIO FOR ACOUSTIC SCENES

(71) Applicant: Netflix, Inc., Los Gatos, CA (US)

(72) Inventors: Yadong Wang, Campbell, CA (US); Shilpa Jois Rao, Cupertino, CA (US); Murthy Parthasarathi, Fremont, CA (US); Kyle Tacke, Glendale, CA (US)

(73) Assignee: Netflix, Inc., Los Gatos, CA (US)

( * ) Notice: Subject to any disclaimer, the term of this patent is extended or adjusted under 35 U.S.C. 154(b) by 215 days.

(21) Appl. No.: 16/732,142

(22) Filed: Dec. 31, 2019

(65) Prior Publication Data

US 2021/0201931 A1    Jul. 1, 2021

(51) Int. Cl.
| | |
|---|---|
| *G10L 25/51* | (2013.01) |
| *G10L 15/00* | (2013.01) |
| *G10L 15/22* | (2006.01) |
| *G10L 25/81* | (2013.01) |
| *G10L 25/84* | (2013.01) |

(52) U.S. Cl.
CPC ............ *G10L 25/51* (2013.01); *G10L 15/005* (2013.01); *G10L 15/22* (2013.01); *G10L 25/81* (2013.01); *G10L 25/84* (2013.01)

(58) Field of Classification Search
CPC ......... G10L 25/51; G10L 25/03; G10L 25/27; G10L 25/33; G10L 25/48; G10L 25/57; G10L 25/69; G10L 25/81; G10L 25/84; G10L 21/00; G10L 21/02; G10L 21/0208; G10L 21/021; G10L 21/0224; G10L 21/0232; G10L 21/028; G10L 21/0324; G10L 21/0332; G10L 21/18;

(Continued)

(56) References Cited

U.S. PATENT DOCUMENTS 11,112,389 B1 *  9/2021  Robinson ............... G01N 29/14
2013/0151251 A1   6/2013  Herz et al.
(Continued)

FOREIGN PATENT DOCUMENTS

| CN | 109119063 B | 11/2019 |
|---|---|---|
| WO | 2007/103520 A2 | 9/2007 |
| WO | 2018/090356 A1 | 5/2018 |

OTHER PUBLICATIONS

International Search Report and Written Opinon received for PCT Application Serial No. PCT/US2020/067661 dated Apr. 28, 2021, 11 pages.

*Primary Examiner* — Qi Han
(74) *Attorney, Agent, or Firm* — FisherBroyles, LLP (57) ABSTRACT

The disclosed computer-implemented method may include obtaining an audio sample from a content source, inputting the obtained audio sample into a trained machine learning model, obtaining the output of the trained machine learning model, wherein the output is a profile of an environment in which the input audio sample was recorded, obtaining an acoustic impulse response corresponding to the profile of the environment in which the input audio sample was recorded, obtaining a second audio sample, processing the obtained acoustic impulse response with the second audio sample, and inserting a result of processing the obtained acoustic impulse response and the second audio sample into an audio track. Various other methods, systems, and computer-readable media are also disclosed.

20 Claims, 5 Drawing Sheets

(58) Field of Classification Search
CPC . G10L 2021/02082; G10L 2021/02087; G10L 2021/02161
USPC ....... 704/278, 200, 201, 202, 232, 233, 243, 704/245, 255, 500
See application file for complete search history.

(56) References Cited

U.S. PATENT DOCUMENTS

| | | |
|---|---|---|
| 2014/0161270 A1 | 6/2014 | Peters et al. |
| 2017/0353789 A1* | 12/2017 | Kim ........................ H04R 3/005 |
| 2019/0392852 A1 | 12/2019 | Hijazi et al. |
| 2021/0142815 A1* | 5/2021 | Bryan .................... G06N 20/00 |

* cited by examiner

SYSTEM AND METHODS FOR AUTOMATICALLY MIXING AUDIO FOR ACOUSTIC SCENES

BACKGROUND

Digital content distribution systems may provide a variety of different types of content (e.g., tv shows, movies, etc.) to end users. This content may include both audio and video data and may be sent to a user's content player as a multimedia stream. As a result, streaming content has become a very popular form of entertainment. The ability to enjoy a film, television program or other form of audiovisual content in the comfort of one's home or on the go offers many advantages to viewers.

This audiovisual content may be produced in a variety of different languages. Because a person viewing the streaming content may not understand the dialog if it is spoken in a foreign language, the dialog is often dubbed into multiple languages so users can select the dubbing they will understand. This increases the potential audience for content and can be an important aspect of expanding the market for the content.

Conventional approaches to dubbing dialog into a different language utilize one of two methods: either preparing an anechoic version of the dubbed dialog that is recorded in a recording studio in which echoes are suppressed or eliminated or preparing a dubbed version that is subjected to manipulation and further processing by an audio engineer. However, both of these conventional approaches have disadvantages.

In addition to speech, other auditory aspects of the audiovisual content may be used as part of an audio track including music, location-specific sounds, or sound effects. Such additional components of an audio track are often added to an audio track for a film, television program, or other form of audiovisual content during post-processing of the content. Adding these additional components in a manner that sounds realistic is also a challenge for conventional approaches.

SUMMARY

As will be described in greater detail below the present disclosure describes systems and methods for more realistically and efficiently creating an audio track that includes speech, music, or sound effects that sound to the listener as if they were produced in a specific environment, such as a room, hallway, outdoor venue, etc. The created audio track may be inserted into an existing track to replace or overlay a portion of the existing track. In one use case, the created track may represent a dubbed version of a segment of speech (dialog) from a film or television show.

In some examples, a more realistic sounding dubbed version may be created by determining the acoustic characteristics of an environment (such as an auditorium, bedroom, living room, or other location) used in a scene and automatically applying that set of characteristics to dubbed dialog that was recorded in an anechoic environment. The acoustic characteristics may be determined by generating a set of training data and then using that data to train a machine learning model. The trained model may then be applied to a segment of dialog spoken in a first language from a scene. The model may identify one or more profiles of an environment in which the scene was most likely to have been recorded.

Each environment profile may be associated with a specific acoustic impulse response, which corresponds to (and represents) the acoustic properties of the environment (e.g., echo, reverb, damping, etc.). The profile may include or be associated with physical and/or acoustic characteristics of a room or location that are responsible for the acoustic properties of the room or location (where these properties may include reverb, decay of certain frequencies, etc.). The appropriate acoustic impulse response may be combined with the segment of dialog spoken in a second language and recorded in an anechoic environment. The result of the combination process may be inserted back into the audio track from which the segment of dialog spoken in the first language was obtained. The resulting audio may thus "sound" to a listener as representing the dialog spoken in the same (or very close to the same) environment as the original dialog in the scene.

In one example, a computer-implemented method may include obtaining an audio sample from a content source, inputting the obtained audio sample into a trained machine learning model, obtaining the output of the trained machine learning model, wherein the output is a profile of an environment in which the input audio sample was recorded, obtaining an acoustic impulse response corresponding to the profile of the environment in which the input audio sample was recorded, obtaining a second audio sample, processing the obtained acoustic impulse response with the second audio sample, and inserting a result of processing the obtained acoustic impulse response and the second audio sample into an audio track.

In some examples, the accessed audio segment in the first language may include multiple sections of dialog, where all of the sections of dialog are spoken in the same room, location, or environment in a film or television show.

In some examples, the machine learning model may be trained using a set of training data comprising a set of audio samples recorded in an anechoic environment and a set of profiles, with each profile corresponding to a specific environment and being associated with an acoustic impulse response.

In some examples, the set of audio samples include speech samples.

In some examples, the audio sample input to the trained machine learning model may be a sample of speech and the second audio sample may be a version of the input sample in a different language (i.e., a dubbed version).

In some examples, the result of processing the obtained acoustic impulse response and the second audio sample may be inserted into an audio track from which the input audio sample was obtained in approximately the same place in the audio track from which the input audio sample was obtained.

In some examples, the result of processing the obtained acoustic impulse response and the second audio sample may be inserted into the audio track from which the input sample was obtained in a different place in the audio track from which the input audio sample was obtained.

In some examples, the profile of the environment may include information relating to the acoustic properties of the environment.

In some examples, the environment may be a room, setting or location, and the profile may include a physical characteristic of the room, setting or location.

In some examples, the content source may be a film or television program, and the sample is from a scene in the film or program.

In some examples, the second audio sample may include music, background sound or a sound effect.

In some examples, a training set may be developed from a set of decay time data that represents a time period over which an audio signal decays to a certain level in a specific room, location, or environment. A machine learning model may be trained to identify a type or profile of a room, location, or environment in which a segment of speech is spoken in a scene based on the decay time measured for that scene.

In some examples, a speech sample may require pre-processing prior to being used as part of the training data or as an input to the trained model. This pre-processing can include performing a Fourier Transform or Fast Fourier Transform (FFT) on the speech sample. This pre-processing may be used to enable the training data to be input to the model or to enable a convolution operation to be performed between a speech sample and an acoustic impulse response. In some examples, the result of the convolution operation may need post-processing (such as by application of an Inverse Fourier Transform or Inverse Fast Fourier Transform) in order to prepare the result for insertion back into the audio track.

In addition to the computer-implemented method, a corresponding system for automatically mixing audio may include several modules stored in memory. These modules may include a module containing instructions which when executed perform a process to access an electronic data storage element or memory and obtain a plurality of audio samples recorded in an anechoic environment and a plurality of environment profiles, a module to process the accessed audio samples (if needed) and combine each audio sample with each profile to produce a set of training data, and a module to use the set of training data as inputs to a machine learning model to train the model to respond to an input audio sample by outputting an indication of the environment in which the input sample was recorded. Note that the preparation of a set of training data and training of the machine learning model may be performed by a separate entity from the one practicing the other aspects of the disclosure. In this case, the corresponding system may not include one or more of the modules just described.

The modules may further include a module containing instructions which when executed perform a process to access or obtain an audio sample from an audio track of a film or television program and input the sample to the trained model. The trained model may respond to the input sample by identifying or classifying the input and providing an indication of a profile or environment in which the input sample was recorded for the audio track. The modules may further include a module containing instructions which when executed combine a second audio sample recorded in an anechoic environment with the impulse response corresponding to the environment in which the input audio sample was recorded for the audio track. The result of the combination (e.g., a convolution process, a filtering, an addition of specific frequency components or amplitudes, etc.) may then be processed if needed (e.g., by performing an inverse Fourier Transform) and inserted back into the audio track.

In some examples, the above-described method may be encoded as computer-readable instructions on a computer-readable medium. For example, a computer-readable medium may include one or more computer-executable instructions that, when executed by at least one processor of a computing device, cause the computing device to obtain an audio sample from a content source, input the obtained audio sample into a trained machine learning model, obtain the output of the trained machine learning model, wherein the output is a profile of an environment in which the input audio sample was recorded, obtain an acoustic impulse response corresponding to the profile of the environment in which the input audio sample was recorded, obtain a second audio sample, combine the obtained acoustic impulse response with the second audio sample, and insert a result of combining the obtained acoustic impulse response and the second audio sample into an audio track.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to systems and methods for more efficiently and consistently creating a realistic audio track that includes speech, music, background sound or sound effects that will "sound" to the listener as if they were produced in a specific environment, such as a room, hallway, outside location, etc. The created audio track is inserted into an existing track to replace a portion of the existing track. In this use case, the created track can represent a dubbed (or second language) version of a segment of speech (dialog) from a film or television show. In some embodiments, the dubbed version is created by determining the acoustic characteristics of an environment (such as an auditorium, bedroom, living room, or other location) used in a scene in which dialog is spoken and applying that set of characteristics to the dubbed dialog for the scene, where the dubbed dialog is recorded in an anechoic environment. The result of applying the set of environment characteristics to the dubbed dialog is then inserted back into the audio track from which the segment of dialog spoken in the first language was obtained. The resulting audio sounds to a listener as if the dubbed dialog was spoken in the same (or very close to the same) environment as the original dialog in the scene.

As will be explained in greater detail below, embodiments of the present disclosure can be used to automatically generate more realistic sounding content for the audio track of a film or television program. The content may represent a dubbed version of dialog, a piece of music, background sounds or sound effects. After processing using the described approach, the content will sound to the viewer/listener as if produced in the environment depicted in the scene in which the content is played as part of the audio track. The systems and methods described can automate what is typically a labor intensive and often imprecise trial and error process performed manually by sound engineers. This conventional manual process may be subject to the biases and preferences of each sound engineer and may lead to inconsistencies between the results of dubbing performed by different engineers.

The described computer-implemented processing pipeline creates a trained machine learning model using specific training data and then uses the model to determine an environment in which a specific sample of speech, music, or a sound effect was recorded. The process then uses that information to modify a second sample of speech, music or a sound effect to produce resulting audio that includes the characteristics of the environment. The resulting audio can then be inserted into an audio track of an audiovisual presentation.

A viewer of the presentation will then hear dubbed dialog, or music, background sound or a sound effect as if it was being generated in a specific environment, where the environment will typically correspond to the visual aspects of a scene. This makes the added or altered audio "sound" as if it is being generated naturally in the scene or setting being displayed, thereby preventing any disruption or confusion to the viewer/listener.

The following will provide, with reference to FIGS. 1-5, detailed descriptions of a computer-implemented process and system for automatically producing audio content that closely matches what the content would sound like if generated in a specific environment. The environment can be a room, hallway, location, outdoor setting, etc. The audio content can represent a dubbed version of dialog, a piece of music, background sound, or a sound effect.

As mentioned, conventional approaches to dubbing dialog into a different language utilize one of two methods: either preparing an anechoic version of the dubbing that is recorded in a recording studio in which echoes are suppressed or eliminated, or preparing a dubbed version that is subjected to manipulation and further processing by an audio engineer. In the first approach, a disadvantage is that the anechoic version does not satisfactorily reproduce the sound of the actual dialog because it fails to take into account the acoustic features of the room or location in which the dialog is spoken in the film or television show. This can be very important to the overall sound of the dialog due to an environment's inherent reverberation, distortion, damping of certain frequencies, frequency-specific changes to the sound, etc. For example, dialog spoken in an auditorium will sound very differently than the same dialog spoken in a bedroom. Similarly, dialog spoken indoors will sound different than dialog spoken outdoors. And, as a result, the dubbed version may sound artificial, jarring, or out of place to the viewer/listener.

In the second approach, a trial and error method of altering the dubbed version to make it sound more like it was being spoken in the same room or location as the original dialog is performed. This can be time consuming, and as with the first approach, may not provide an accurate representation of the room or location in which the dialog is spoken in the original film or program. Further, this approach leads to inconsistent results which may be noticed by viewers and found to be distracting.

Further, as also mentioned, adding additional audio elements such as music, background sound or sound effects to an audio track in a manner that sounds realistic is also a challenge for conventional approaches. This is because, as with speech, making the additional elements sound as if they are occurring in a specific environment can be difficult to achieve and requires a significant amount of time and effort. And as mentioned, the mix produced by different sound mixers using the same inputs is not consistent, a result which is undesirable in many situations.

Note that in some examples, the term "audio sample" may refer to speech, music, background sounds, a sound effect or other type of audio content.

Note that in some examples, the phrase "profile of an environment (or of the environment)" may refer to data or information that serves to characterize or label an environment with regards to the physical or acoustic characteristics or parameters of the environment, where the environment can be a room, setting or location.

Note that in some examples, the term "acoustic impulse response" may refer to a representation of the audio response of an environment to an impulse signal.

Figure 1:
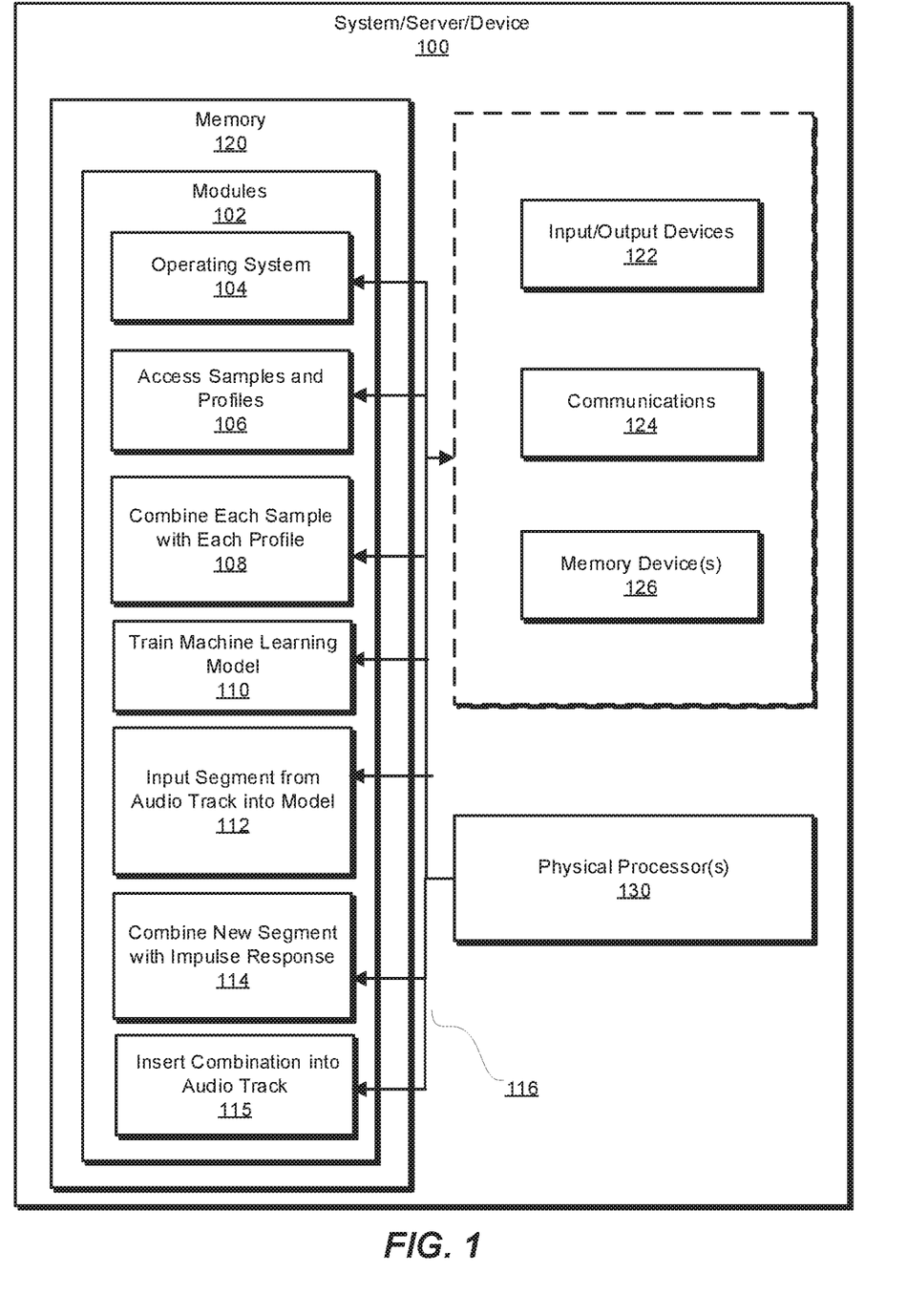
FIG. 1 is a diagram illustrating a system 100 containing a set of modules 102, with each module containing executable instructions, that when executed by an electronic processor implement a method for producing a mixed version of an audio track in accordance with an embodiment of the systems and methods described herein.

FIG. 1 is a diagram illustrating a system 100 containing a set of modules 102, with each module containing executable instructions, that when executed by an electronic processor implement a method for producing a mixed version of an audio track in accordance with an embodiment of the systems and methods described herein. As shown in the figure, system 100 represents a server, computer, sound mixing device or other form of computing or data processing device. Modules 102 each contain a set of executable instructions, where when the set of instructions is executed by a suitable electronic processor (such as that indicated in the figure by "Physical Processor(s) 130"), system (or server or device) 100 operates to perform a specific process, operation, function or method.

Modules 102 are stored in a memory 120, which typically includes an operating system module 104 that contains instructions used (among other functions) to access and control the execution of the instructions contained in other modules. The modules 102 in memory 120 are accessed for purposes of transferring data and executing instructions by use of a "bus" or communications line 116, which also serves to permit processor(s) 130 to communicate with the modules for purposes of executing a set of instructions. Bus or communications line 116 also permits processor(s) 130 to interact with other elements of system 100, such as input or output devices 122, communications elements 124 for exchanging data and information with devices external to system 100, and additional memory devices 126.

Modules 102 contain one or more sets of instructions for performing the method described with reference to FIG. 2. and/or with reference to FIG. 5. These modules can include those illustrated but can also include a greater number or fewer number than those illustrated.

For example, Access Samples and Profiles Module 106 contains instructions, that when executed, access an electronic data storage element or memory and obtain a plurality of audio samples (e.g., speech samples or segments) recorded in an anechoic environment and a plurality of environment profiles (each of which can be associated with an acoustic impulse response that represents the response of that environment to an audio signal).

Similarly, Combine Each Sample with Each Profile Module 108 contains instructions, that when executed, process the accessed audio samples (if needed) and combine each audio sample with each profile to produce a set of training data. The operation of combining can involve one or more of performing a convolution operation between an impulse response associated with a profile and a sample, adding audio elements of the profile to a sample, enhancing or reducing certain audio elements of a sample, applying a cut-off filter to a sample, applying a decay effect to a sample, applying parametric equalization, applying compression, or applying other time- or frequency-based methods of processing audio signals.

Train Machine Learning Model Module 110 contains instructions, that when executed, use the set of training data as inputs to a machine learning model (such as a Deep Neural Network, DNN). The inputs and the annotated or labeled environment profiles are used to "train" the model to respond to an input audio sample by outputting an indication of the environment in which the input sample was generated and recorded. This indication is then used to access the appropriate impulse response corresponding to the environment.

Input Segment from Audio Track into Model Module 112 contains instructions, that when executed, perform a process to access or obtain an audio sample (such as a speech segment containing speech spoken in a first language) from an audio track of a film or television program. The module can also contain instructions that cause the sample to be processed prior to input to the trained model. The audio sample is input to the trained model, with the model responding to the input by identifying or classifying the input and providing an indication of an environment in which the sample was generated and recorded for the audio track. This indication may be a label or identifier for an environment profile or impulse response function, for example.

Combine New Segment with Impulse Response Module 114 contains instructions, that when executed, combine a new audio sample (e.g., representing the dialog in the speech segment input to the model spoken in a second language) recorded in a specified environment (e.g., an anechoic environment) with the impulse response corresponding to the environment in which the input audio sample was recorded for the audio track. The result of the combination (e.g., a convolution process, addition of an acoustic element, filtering, parametric equalization, compression, or other time-based methods of combining audio signals, etc.) is then processed (e.g., by performing an inverse Fourier Transform) if needed. Insert Result of Combination into Audio Track Module 115 contains instructions, that when executed insert the result of the combination back into the audio track.

As noted, the preparation of a set of training data and training of the machine learning model may be performed by a separate entity from the one practicing the other aspects of the disclosure. In that case, system 100 may not include modules one or more of 106, 108 and 110.

Figure 2:
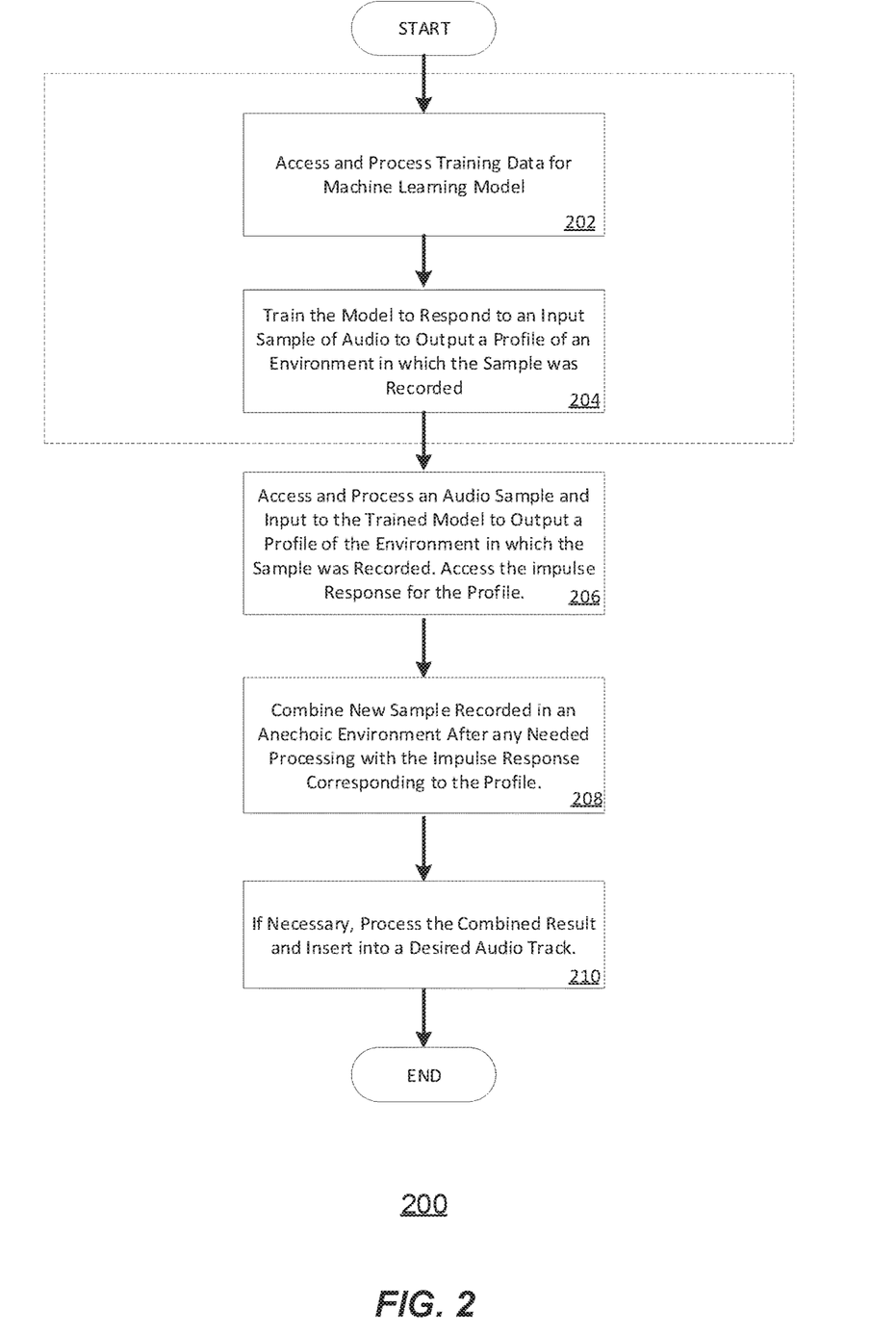
FIG. 2 is a flow chart or flow diagram of an exemplary computer-implemented method, operation, function or process 200 for automatically producing a mixed version of an audio track, in accordance with an embodiment of the systems and methods described herein.

FIG. 2 is a flow chart or flow diagram of an exemplary computer-implemented method, operation, function or process 200 for producing a mixed version of an audio track, in accordance with an embodiment of the systems and methods described herein. The steps shown in FIG. 2 can be performed by any suitable computer-executable code and/or computing system, including the system(s) illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 202 one or more of the systems or modules described herein implements a process to access (and if necessary, process) a set of data to be used in training a machine learning model. As mentioned, the trained model can be provided by the same or a different entity than the one practicing the other stages or steps of the method illustrated in the figure. In one embodiment, the accessed data includes two sets of data: (a) a plurality of audio samples (e.g., speech segments) recorded in an anechoic environment and (b) a set of profiles, with each profile corresponding to a specific environment. In some examples, each profile includes or is associated with an acoustic impulse response, with each such response representing the acoustic properties of a specific environment.

In the context of this description, an impulse response or impulse response function (IRF) represents the acoustic response of a system (in this case an environment, such as a room or location) to a brief input signal or impulse. By combining (typically by performing a convolution operation, although as noted other forms of combination may be used) an input signal with an impulse response, the form the signal would have in the environment represented by the impulse response is generated.

In embodiments of the system and methods described herein, each of a plurality of environments (such as rooms, locations, venues, etc.) are associated with a set of properties, where the properties may include physical and acoustic properties. The set of properties form a profile of the environment. The physical properties can include dimensions of a room, the presence or absence of carpeting or a wall covering, the temperature or humidity in the room, etc. The physical properties of a location can include air temperature, humidity, wind speed, etc. The acoustic properties of a room or location can include a measure of the reverberation in the environment, a measure of the echo, a measure of a decay time for a specific frequency, a frequency cut-off, or a frequency response.

Each profile is also associated with a corresponding impulse response function or acoustic impulse response. In this way, each of the plurality of environments in which a speech segment or other audio sample is recorded can be associated with a corresponding acoustic impulse response.

Figure 3:
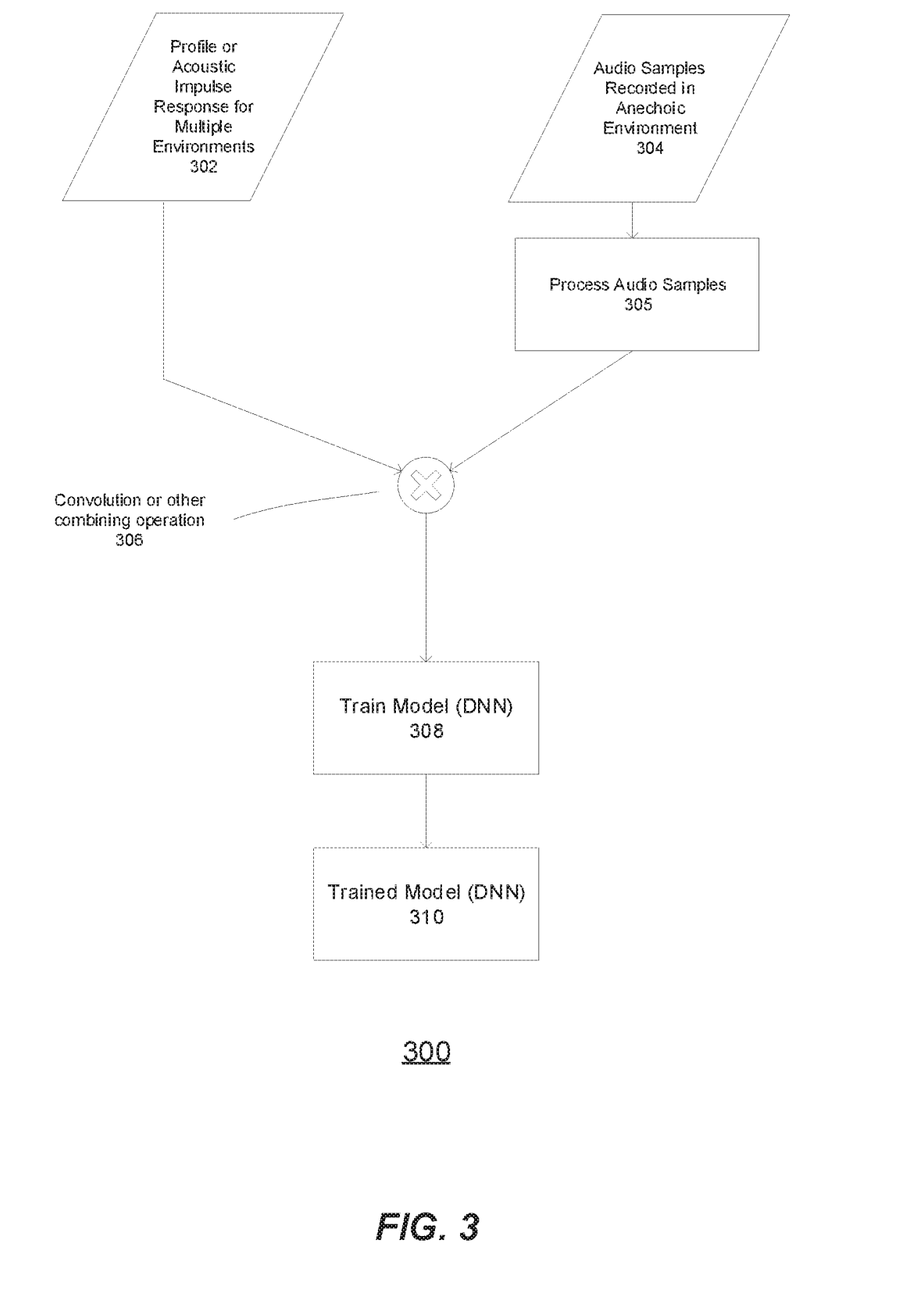
FIG. 3 is a diagram illustrating a method, operation, function or process for generating a set of data for training a machine learning model for use in producing a mixed version of an audio track, in accordance with an embodiment of the systems and methods described herein.

In one example, the set of audio samples (e.g., speech segments) and the set of profiles (or in some examples, the set of acoustic impulse responses) are combined to form the set of training data. This can require initial pre-processing of one or both sets of data. Typically, the acoustic impulse response is represented in the frequency space and does not require pre-processing prior to being used in a convolution operation. However, the audio samples or speech segments may require processing by being subjected to a Fourier Transform prior to being used to train the model. As will be described, FIG. 3 illustrates an example of a process for generating the training set and training the model.

Each acoustic impulse response is identified with, or corresponds to, a specific profile, and hence to a specific environment or set of characteristics. The training set for the machine learning model is generated by combining each one of the plurality of audio samples (e.g., speech segments) after any needed pre-processing (such as by performing a Fourier Transform on the samples/segments) with each one of the environment profiles. As mentioned, the operation of combining can involve performing a convolution operation between an impulse response associated with a profile and a sample, adding audio elements of the profile to a sample, enhancing or reducing certain audio elements of a sample, applying a cut-off filter to a sample, applying a decay effect to a sample, parametric equalization, compression or other time-based methods of combining audio signals, etc.

The machine learning model is trained using the generated set of training data (step 204). The training set includes examples of audio that would be recorded in a set of environments (i.e., each combination represents the expected influence of an environment on the frequency components of a sample) and a label for each environment. This enables the model to "learn" how to associate specific environmental affects on a sample or its acoustic components with the corresponding environment. The trained model operates to respond to an input audio sample (e.g., a segment of speech) by outputting a profile or indication of an environment (such as a room or location) in which the model believes the input was recorded. In some embodiments and depending on the form of the data used to train the model, the trained model outputs an indicator of an acoustic impulse response for the environment.

Still further, in some embodiments, the machine learning model may be trained to correspond to a set of tools. For example, recording and production studios typically have access to audio processing tools (e.g., software applications) that provide different audio processing functions. For instance, an audio processing tool may provide a reverb plug-in that applies reverb in a specified manner to an audio signal. Another audio processing tool may apply filters or a set of specified filters to an audio signal. These audio processing tools may include some functions that are common across production studios and some functions that are specific to each studio. In at least some of the embodiments described herein, the machine learning model may be trained using a particular set of tools or plug-ins that is used by a specific studio. Then, when the trained model outputs a profile or indication of an environment in which the model believes the input audio signal was recorded, the model may indicate, for example, which plug-ins the engineer should use to achieve a certain sound or to emulate a certain environment. In this manner, the trained model may provide tailored guidance to audio engineers on a studio-by-studio basis, depending on which audio processing tools or plug-ins that studio is using.

Next, as shown at step 206, an audio sample (e.g., a segment of speech or other type of audio sample) from an audio track is input to the trained model. In one example, the sample is a segment of speech in a first language and is from a scene in a film or television program. The segment of speech can require pre-processing (such as being subject to a Fourier Transform) prior to being input to the model. In response to the input, the trained model will output a profile or indicator of an environment in which the input audio sample was recorded. In some embodiments, the trained model outputs an indicator of an acoustic impulse response corresponding to the environment in which the input sample was recorded. If the model is trained to output an environment profile label or indicator, then the profile is used to access the corresponding acoustic impulse response.

Next, as shown at step 208, a dubbed version (i.e., the dialog spoken in a second language) of the input speech segment is obtained. In some examples, instead of a dubbed version, a new sample of audio to be added to the audio track is used. The dubbed version or the new sample have been recorded in an anechoic environment. The dubbed version or new sample is subjected to any needed pre-processing (such as being operated on by a Fourier Transform) and then is combined (e.g., using a convolution operation, adding frequency components, filtering, altering based on the impulse response, implementing parametric equalization, compression, or other time- or frequency-based method of combining, etc.) with the acoustic impulse response corresponding to the environment in which the original speech segment (i.e., the segment in the first language) was recorded.

The result of the combining/convolution operation is then subjected to any needed post-processing (such as being subjected to an inverse Fourier Transform), with the result being inserted back into the audio track, typically in place of the speech segment spoken in the first language, as shown at step 210.

As has been described with reference to FIG. 2, embodiments of the system and methods described herein can be used to generate a more realistic-sounding dubbed version of the dialog or background speech in a scene. This is accomplished using a trained machine learning model which determines the acoustic properties of the environment in which the original version of the dialog or background speech was recorded, followed by applying the acoustic properties of that environment to an anechoic recording of the dubbed version of the dialog. As mentioned, in addition to speech, music, background sounds or sound effects can also be processed by combining them with an impulse response or other characteristic of an environment to produce realistic sounding music, background sounds or sound effects that better correspond to the sound expected from the scene in which the music, background sounds, or sound effects are played.

FIG. 3 is a diagram illustrating a method, operation, function or process for generating a set of data for use in training a machine learning model for use in producing a mixed version of an audio track, in accordance with an embodiment of the systems and methods described herein. Note that the process illustrated in FIG. 3 represents one way of generating a set of training data based on creating a set of inputs to the model, and other ways of generating the training data can be used.

In FIG. 3, and as an example, each input to the machine learning model is the convolution (or other form of combination) of an acoustic impulse response for an environment with a pre-processed speech or audio sample that was recorded in an anechoic environment. Thus, in the embodiment illustrated in FIG. 3, each acoustic impulse response (302) is combined with each speech sample (304) using a convolution process (306). As mentioned, in some embodiments, each speech sample recorded in an anechoic environment (304) may require pre-processing (305), such as by performing a filtering, thresholding or Fourier Transform prior to the convolution operation. Further, as also mentioned, instead of (or in addition to) speech, other types of audio samples, such as sound effects or samples of music can be used.

As mentioned, other combining or processing operations are possible to be used in an embodiment of the disclosure, both in creating the set of training data and in combining the impulse response for an environment with an audio sample to produce the expected sound of the sample if generated in the environment. These combining operations may include convolution, addition of specific acoustic elements, filtering, parametric equalization, compression or other time-based method of combining, etc. The combination method used depends upon the way that an environment is represented in a profile and the form of the audio samples.

With regards to the training set, the result of the combination process is to generate a set of all combinations of input samples and environments, with each combination being labeled or tagged to identify the environment or profile. Thus, the training set represents a number of audio samples as affected or influenced by a number of environments, with the resulting modified audio samples being tagged or identified with a label for a specific environment. As noted, this allows the model to "learn" how to associate a modified audio sample (which includes auditory characteristics resulting from a specific environment) with the specific environment.

Each product of the convolution or other form of combining operation (e.g., addition of an acoustic element, filtering, parametric equalization, compression or other time- or frequency-based method of combining) (306) is input to the machine learning model as part of the training process (308). Note that this is a form of supervised learning, as each input sequence is associated with a specific environment profile, label, indicator or impulse response. In some embodiments, the model takes the form of a Deep Neural Network (DNN). The result of the training process is a trained machine learning model 310.

As will be described further with reference to FIG. 4, the trained model operates or functions to respond to an input sample of audio (such as speech) to output an indication of the environment in which the input sample was recorded. This "indication" can be a label for an impulse response or for a profile corresponding to the environment.

Figure 4:
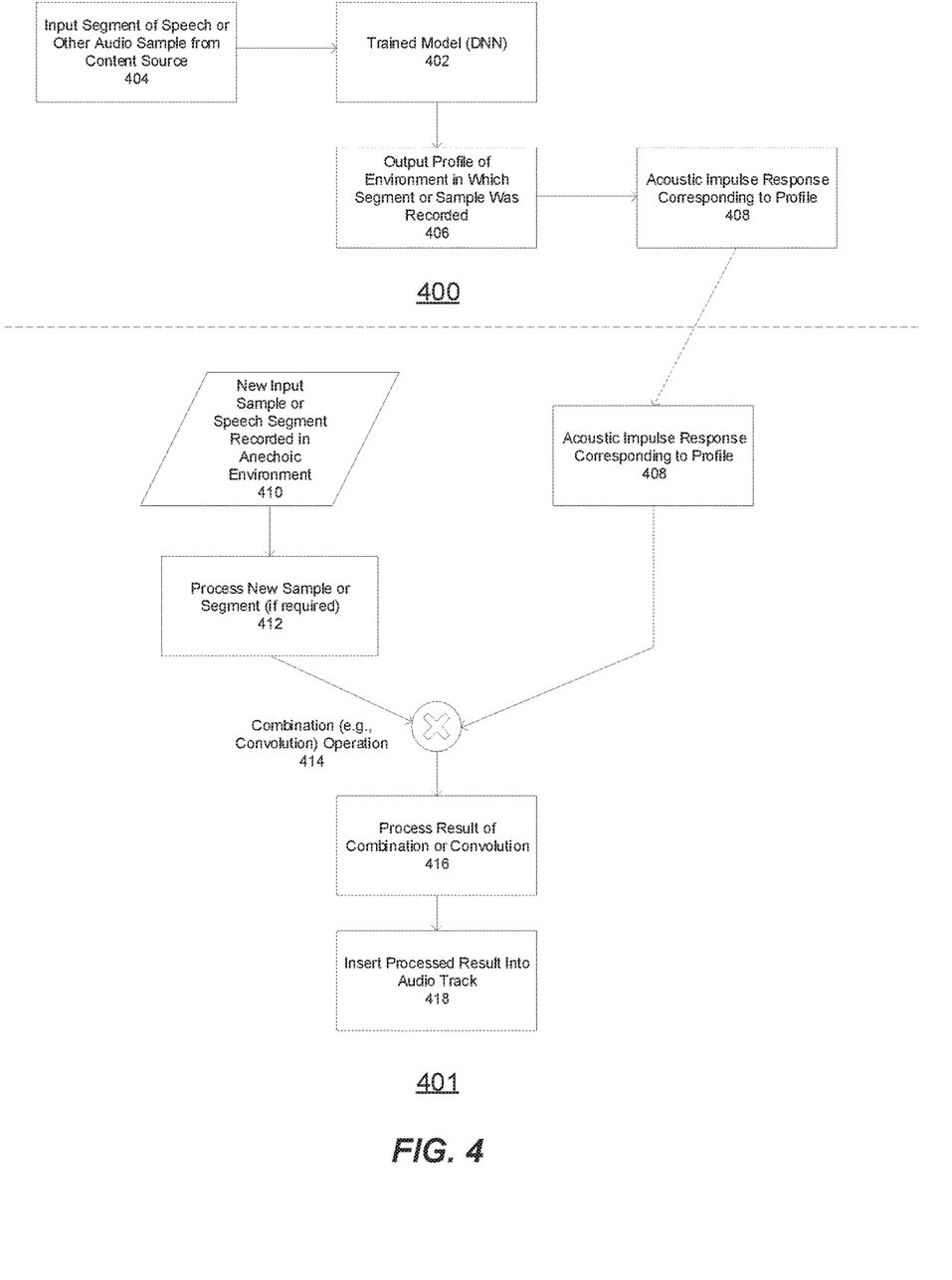
FIG. 4 is a diagram illustrating (a) the operation of the trained machine learning model of FIG. 3, and (b) an example of the use of the output of the trained model to generate the mixed (e.g., dubbed) version of an audio track, in accordance with an embodiment of the systems and methods described herein.

FIG. 4 is a diagram illustrating (a) the operation of the trained machine learning model of FIG. 3, and (b) an example of the use of the output of the trained model to generate the mixed (e.g., dubbed) version of an audio track, in accordance with an embodiment of the systems and methods described herein.

As shown in the figure, process 400 illustrates the operation of the trained machine learning model 402. Trained model 402 receives as an input a sample of speech, a speech segment, or other audio sample (404). In some embodiments, the sample is obtained from the audio track of a scene in a film or television program. In some embodiments (and depending upon the input format needed for the trained model), the speech segment or audio sample may be pre-processed prior to being input to the model. In response to the input, the trained model outputs an indication of the environment in which the input sample was recorded. This "indication" can, for example, be a label for the environment profile or for the acoustic impulse response for the environment.

As shown in the figure, 401 illustrates a process or method for using the acoustic impulse response corresponding to the environment in which the input speech segment or audio sample was recorded 408 to modify a dubbed version of that speech segment (or other type of audio content) and insert it back into the audio track. As shown in process 401, in one example, a dubbed version of speech segment 410 is recorded in an anechoic environment. The dubbed version 410 is typically in a different language than the original speech segment 404. The dubbed version may require pre-processing (e.g., be operated on by a Fourier Transform) 412 prior to further processing. The dubbed version (after pre-processing if needed) is then convolved or otherwise combined 414 with the acoustic impulse response 408 corresponding to the profile of the environment in which the speech sample from the audio track was originally recorded.

The result of the convolution or combination operation is then processed by performing an inverse Fourier Transform (or other required processing) 416 on the result. The processed result is then inserted back into the audio track 418. Note that although the processed result is typically inserted back into the audio track at the same location or time slot as the original speech segment, it can instead be inserted at a different location, such as after the location or time slot of the original speech segment (e.g., adjacent to it).

The result of the operations or processes described with reference to FIG. 4 is to replace or augment a section of an audio track that was originally spoken in a first language and recorded in a specific environment with a section spoken in a second language that sounds as if it was recorded in the same environment. Further, as mentioned, the described processing pipeline can also be used to determine a profile or impulse response of an environment in which music, background sound or a sound effect is recorded and then apply the audio characteristics of that environment to another piece of music, background sound or sound effect. Even further, the described processing approach can be used to modify speech, music, background sound, or a sound effect to make that audio content sound as if it was generated in any desired environment for which a profile is available.

Figure 5:
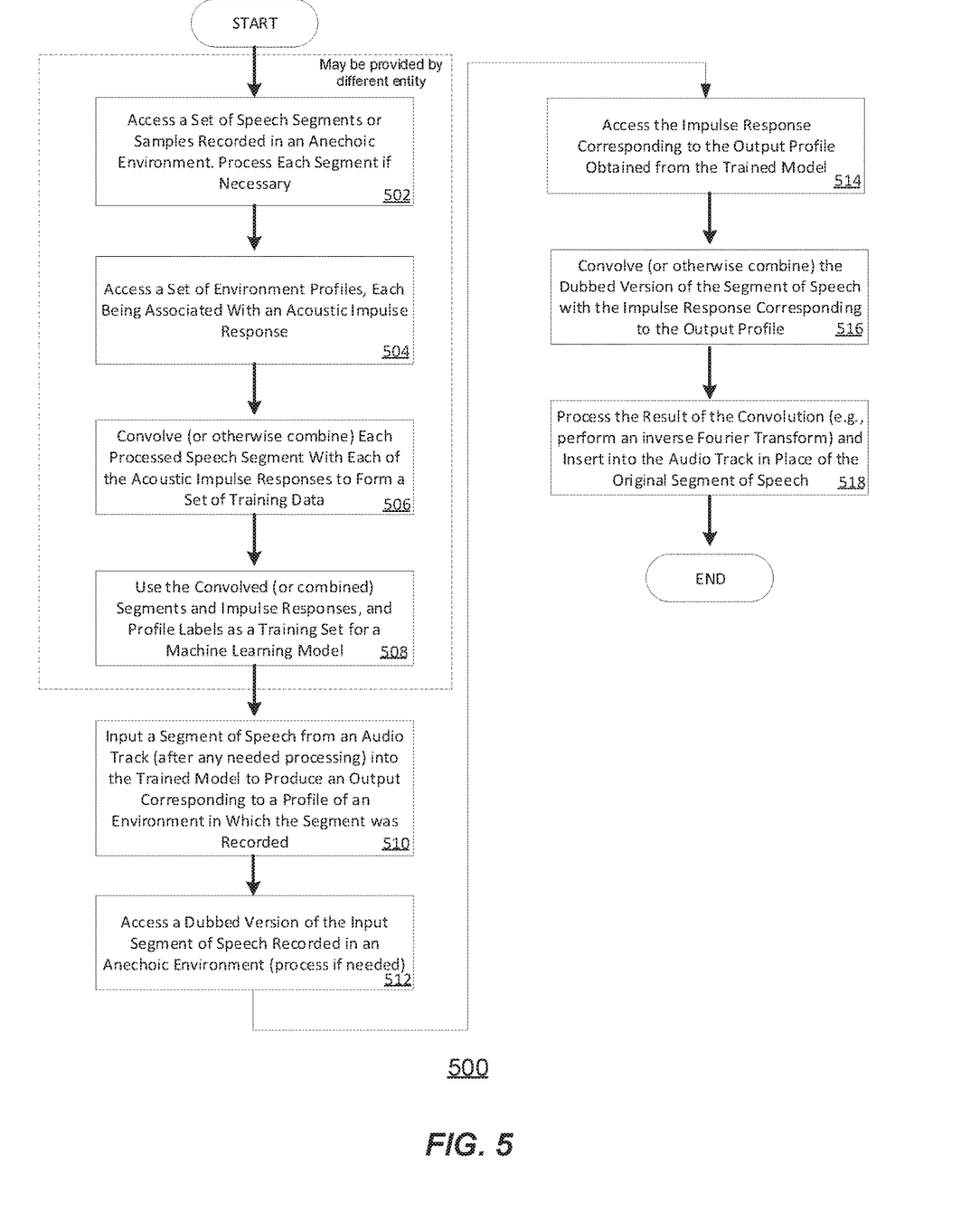
FIG. 5 is a flow chart or flow diagram of an exemplary computer-implemented method, operation, function or process 500 for producing a mixed version of an audio track, in accordance with an embodiment of the systems and methods described herein.

FIG. 5 is a flow chart or flow diagram of an exemplary computer-implemented method, operation, function, or process 500 for producing a mixed version of an audio track, in accordance with an embodiment of the systems and methods described herein. The process illustrated in FIG. 5 represents an embodiment of the system and methods described herein that is presented in greater detail than that illustrated in FIG. 2.

As shown in FIG. 5, process 500 starts with a system or module accessing and if necessary, processing a set of speech segments 502, where each segment was recorded in an anechoic environment. In some embodiments, each speech segment is subjected to a Fourier Transform prior to further use as part of a set of training data. Next (or in some embodiments previously or contemporaneously), process 500 accesses a set of acoustic impulse responses, where each acoustic impulse response is associated or labeled with a profile or indicator of an environment 504. In the context of the system and methods described herein, an environment is typically (although not exclusively) a room or location in which a segment of speech is recorded (e.g., a bedroom in a house, a garden, a tunnel, a beach, a forest, on a boat, an auditorium, etc.).

Each segment in the set of speech segments 502 is convolved or otherwise combined with each impulse response in the set of impulse responses 504 to form a set of training data for a machine learning model 506. The generated set of training data is then used to train a machine learning model 508. The training operation presents the model with a set of modified speech segments (i.e., speech segments as altered by being combined with an impulse response for a specific environment), with each modified segment associated with a label indicating the environment it represents. The model then "learns" how to associate an input audio sample (e.g., speech as modified by a specific environment) with a label or profile identifying or describing the environment.

After completion of the training process 508, the trained model will respond to an input sample of speech recorded in a specific environment by outputting an indication of an environment in which the model "believes" or "decides" the input sample was recorded. In some embodiments, the input sample may require pre-processing prior to being provided to the trained model. The output "indication" can be in the form of a label or profile for the environment or a label for an acoustic impulse response.

In one use case, the input sample of speech is obtained form an audio track for a film or television program. The input sample includes speech spoken in a first language. The trained model outputs a label or indicator of an environment in which the input sample was recorded. Using that label or indicator, the corresponding impulse response for the environment can be obtained 514. In this use case, process 500 accesses or obtains a dubbed version of the sample of speech from the audio track 512. The dubbed version includes speech spoken in a second language and recorded in an anechoic environment.

The dubbed version is convolved or otherwise combined with the obtained acoustic impulse response 516. The result of the convolution/combination process or operation is then processed (if needed, such as by subjecting it to an inverse Fourier Transform) and inserted into the audio track, typically (although not exclusively) in place of the original input sample of speech 518. Note that in some embodiments, the result of the convolution/combination process or operation is inserted into the audio track at a different place or location in the audio track than the original input speech sample (such as adjacent to it).

As described herein, the result of the processes implemented by the modules illustrated and described with reference to FIG. 1 (and the methods or processes illustrated in FIGS. 2 and 5) is to more accurately and efficiently generate dubbed versions of films and television shows in a manner that is consistent and removes the impact of an individual sound mixer's biases and preferences.

As an example of how these techniques may be used, consider a scene in a movie or television program that takes place at a beach. As would be expected, a beach is an environment in which there are a number of background noises (waves, wind, birds, motors, etc.) and in which sound travels differently than at other locations due to the temperature, air currents, and elevation. Assume that it is desired to dub the dialog in the movie in order to expand the audience for the movie.

In this example, a machine learning model is trained using a set of training data that includes audio samples (speech, music, sounds) that a were recorded at a beach or similar location. An audio sample (for example, dialog spoken in a first language) from the movie that was recorded at the beach is input to the trained model. The model responds by outputting a label or indicator of an environment profile that corresponds to the beach. This label or indicator may be used to retrieve an impulse response representing the impact of the beach environment on a sample of audio.

Next, a version of the audio dialog spoken in a different language and recorded in an anechoic environment is obtained. This version is then combined with the impulse response representing the impact of the beach environment to produce a dubbed version of the dialog that will sound as if the dialog was spoken at the beach.

In another example, in some movies it was common to have a scene in which a band was playing a song in a club or at a beach. However, actually recording the band playing live for the scene might require a large amount of equipment and special audio processing during the performance. In this use of the described mixing technique, a sample of dialog that was recorded in the club or at a beach may be used as an input to the trained model to obtain an impulse response corresponding to the club or beach. A studio recording of the band may then be combined with the impulse response to produce an audio track that sounds as if the band is playing live in the club or at the beach. This audio track may then be combined with a video scene is which the band is playing to result in a realistic sounding live performance.

As described, the systems and methods can operate to automatically replace or augment a section of an audio track that was originally spoken in a first language and recorded in a specific environment with a section spoken in a second language that sounds as if it was recorded in the same environment. Further, the processing pipeline described can also be used to insert music, background sound or sound effects into an audio track, with the inserted audio "sounding" as if generated in a specific environment. This capability provides realistic-sounding audio for a wide variety of environments, each of which may have its own specific acoustic properties. For example, different size or shape rooms may have very different properties in terms of reverb, echo, frequency cut-off, etc. Similarly, the materials used on ceilings, walls or floors may affect the acoustic properties of a room. An auditorium has very different acoustic properties than a bedroom or living room in a house, and the described methods enable a realistic sound to be produced for any of those settings.

Note that as described, in some examples, the entire audio processing pipeline may be performed by a programmed computing device or automated electronic sound mixer, and without human intervention. The computerized or automated steps may include accessing an audio sample from an audio track, inputting the sample into a trained model, obtaining the output of the model, using the output to access an impulse response corresponding to the environment in which the audio sample was recorded, combining that impulse response with a new audio sample, and then inserting the combination into the same or another audio track.

The present disclosure describes systems and methods for more realistically and efficiently creating an audio track that includes speech, music, background sound or sound effects that sound to the listener as if they were produced in a specific environment, such as a room, hallway, etc. The created audio track may be inserted into an existing track to replace a portion of the existing track. In this use case, the created track may represent a dubbed version of a segment of speech (dialog) from a film or television show. As a result of using the system and methods described, one can automate what is typically a labor intensive and often imprecise process performed manually by sound engineers, as well as remove the impact of an individual sound engineer's biases and preferences.

Example Embodiments

1. A computer-implemented method, comprising: obtaining an audio sample from a content source; inputting the obtained audio sample into a trained machine learning model; obtaining the output of the trained machine learning model, wherein the output is a profile of an environment in which the input audio sample was recorded; obtaining an acoustic impulse response corresponding to the profile of the environment in which the input audio sample was recorded; obtaining a second audio sample; combining the obtained acoustic impulse response with the second audio sample; and inserting a result of combining the obtained acoustic impulse response and the second audio sample into an audio track.

2. The computer-implemented method of claim 1, wherein the machine learning model is trained using a set of training data, and further wherein the set of training data comprises a set of audio samples recorded in an anechoic environment and a set of environment profiles, wherein each environment profile is associated with an acoustic impulse response.

3. The computer-implemented method of claim 2, wherein the set of audio samples include speech samples.

4. The computer-implemented method of claim 2, wherein each of the acoustic impulse responses represents a time period over which an audio signal decays to a certain level in a specific environment, and further, wherein the machine learning model is trained to identify an environment in which a sample of speech is spoken in a scene based on the decay time measured for that environment.

5. The computer-implemented method of claim 1, wherein combining the obtained acoustic impulse response with the second audio sample further comprises performing a convolution operation between the acoustic impulse response and the second audio sample.

6. The computer-implemented method of claim 1, wherein the audio sample input to the trained machine learning model is a sample of speech and the second audio sample is a version of the input sample in a different language.

7. The computer-implemented process of claim 1, wherein the result of combining the obtained acoustic impulse response and the second audio sample is inserted into an audio track from which the input audio sample was obtained in approximately the same place in the audio track from which the input audio sample was obtained.

8. The computer-implemented process of claim 1, wherein the result of combining the obtained acoustic impulse response and the second audio sample is inserted into the audio track from which the input sample was obtained in a different place in the audio track from which the input audio sample was obtained.

9. The computer-implemented method of claim 1, wherein the environment is a room or location.

10. The computer-implemented method of claim 1, wherein the content source is a film or television program, and further wherein the sample is from a scene in the film or program.

11. The computer-implemented method of claim 1, wherein the second audio sample includes music, background noise or a sound effect.

12. The computer-implemented method of claim 1, wherein the sample of speech from the audio track is a plurality of samples and each of the plurality of samples includes speech that is spoken in the environment.

A computer system comprising: at least one processor, a physical memory comprising computer-executable instructions that, when executed by the physical processor, cause the physical processor to: obtain an audio sample from a content source, input the obtained audio sample into a trained machine learning model; obtain the output of the trained machine learning model, wherein the output is a profile of an environment in which the input audio sample was recorded; obtain an acoustic impulse response corresponding to the profile of the environment in which the input audio sample was recorded; obtain a second audio sample; combine the obtained acoustic impulse response with the second audio sample; and insert a result of combining the obtained acoustic impulse response and the second audio sample into an audio track.

14. The system of claim 13, further comprising computer-executable instructions that, when executed by the physical processor, cause the physical processor to process the obtained acoustic impulse response with the second audio sample by performing a convolution operation between the acoustic impulse response and the second audio sample.

15. The system of claim 13, further comprising computer-executable instructions that, when executed by the physical processor, cause the physical processor to insert the result of combining the obtained acoustic impulse response and the second audio sample into an audio track from which the input audio sample was obtained in approximately the same place in the audio track from which the input audio sample was obtained.

16. The system of claim 13, further comprising computer-executable instructions that, when executed by the physical processor, cause the physical processor to process a set of training data for training the machine learning model, wherein processing the set of training data comprises performing a Fourier Transform on each sample in a set of audio samples and performing a convolution operation between each transformed sample in the set of audio samples and each acoustic impulse response in a set of acoustic impulse responses.

17. A non-transitory computer-readable medium comprising one or more computer-executable instructions that, when executed by at least one processor of a computing device, cause the computing device to: obtain an audio sample from a content source; input the obtained audio sample into a trained machine learning model; obtain the output of the trained machine learning model, wherein the output is a profile of an environment in which the input audio sample was recorded; obtain an acoustic impulse response corresponding to the profile of the environment in which the input audio sample was recorded; obtain a second audio sample; combine the obtained acoustic impulse response with the second audio sample; and insert a result of combining the obtained acoustic impulse response and the second audio sample into an audio track.

18. The non-transitory computer-readable medium of claim 17, wherein the one or more computer-executable instructions include instructions that, when executed by at least one processor of a computing device, cause the computing device to insert the result of combining the obtained acoustic impulse response and the second audio sample into an audio track from which the input audio sample was obtained in approximately the same place in the audio track from which the input audio sample was obtained.

19. The non-transitory computer-readable medium of claim 17, wherein the one or more computer-executable instructions include instructions that, when executed by at least one processor of a computing device, cause the computing device to process a set of training data for training the machine learning model, wherein processing the set of training data comprises performing a Fourier Transform on each sample in a set of audio samples and performing a convolution operation between each transformed sample in the set of audio samples and each acoustic impulse response in a set of acoustic impulse responses.

20. The non-transitory computer-readable medium of claim 17, wherein the one or more computer-executable instructions include instructions that, when executed by at least one processor of a computing device, cause the computing device to combine the obtained acoustic impulse response with the second audio sample by performing a convolution operation between the acoustic impulse response and the second audio sample.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive audio samples recorded in an anechoic environment and environment profiles, transform the received data into a set of training data for a machine learning model, use the trained model to process an input audio sample, generate an output from the model representing an environment in which the input sample was recorded, receive a new audio sample recorded in an anechoic environment and process the new audio sample with an impulse response function corresponding to the environment in which the input sample was recorded, thereby transforming the new audio sample into a representation of what the new sample would sound like if recorded in the same environment as the input audio sample. The transformed new sample is then inserted back into an audio track, in some examples in place of the original input sample.

Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method, comprising:
obtaining an audio sample from a content source;
inputting the obtained audio sample into a trained machine learning model;
obtaining the output of the trained machine learning model, wherein the output is a profile of an environment in which the input audio sample was recorded;
obtaining an acoustic impulse response corresponding to the profile of the environment in which the input audio sample was recorded;
obtaining a second audio sample;

combining the obtained acoustic impulse response with the second audio sample; and inserting a result of combining the obtained acoustic impulse response and the second audio sample into an audio track.

2. The computer-implemented method of claim 1, wherein the machine learning model is trained using a set of training data, and further wherein the set of training data comprises a set of audio samples recorded in an anechoic environment and a set of environment profiles, wherein each environment profile is associated with an acoustic impulse response.

3. The computer-implemented method of claim 2, wherein the set of audio samples include speech samples.

4. The computer-implemented method of claim 2, wherein each of the acoustic impulse responses represents a time period over which an audio signal decays to a certain level in a specific environment, and further, wherein the machine learning model is trained to identify an environment in which a sample of speech is spoken in a scene based on the decay time measured for that environment.

5. The computer-implemented method of claim 1, wherein combining the obtained acoustic impulse response with the second audio sample further comprises performing a convolution operation between the acoustic impulse response and the second audio sample.

6. The computer-implemented method of claim 1, wherein the audio sample input to the trained machine learning model is a sample of speech and the second audio sample is a version of the input sample in a different language.

7. The computer-implemented process of claim 1, wherein the result of combining the obtained acoustic impulse response and the second audio sample is inserted into an audio track from which the input audio sample was obtained in approximately the same place in the audio track from which the input audio sample was obtained.

8. The computer-implemented process of claim 1, wherein the result of combining the obtained acoustic impulse response and the second audio sample is inserted into the audio track from which the input sample was obtained in a different place in the audio track from which the input audio sample was obtained.

9. The computer-implemented method of claim 1, wherein the environment is a room or location.

10. The computer-implemented method of claim 1, wherein the content source is a film or television program, and further wherein the sample is from a scene in the film or program.

11. The computer-implemented method of claim 1, wherein the second audio sample includes music, background noise or a sound effect.

12. The computer-implemented method of claim 1, wherein the sample of speech from the audio track is a plurality of samples and each of the plurality of samples includes speech that is spoken in the environment.

13. A system, comprising:
 at least one physical processor;
 a physical memory comprising computer-executable instructions that, when executed by the physical processor, cause the physical processor to:
  obtain an audio sample from a content source;
  input the obtained audio sample into a trained machine learning model;
  obtain the output of the trained machine learning model, wherein the output is a profile of an environment in which the input audio sample was recorded;
  obtain an acoustic impulse response corresponding to the profile of the environment in which the input audio sample was recorded;
  obtain a second audio sample;
  combine the obtained acoustic impulse response with the second audio sample; and
  insert a result of combining the obtained acoustic impulse response and the second audio sample into an audio track.

14. The system of claim 13, further comprising computer-executable instructions that, when executed by the physical processor, cause the physical processor to process the obtained acoustic impulse response with the second audio sample by performing a convolution operation between the acoustic impulse response and the second audio sample.

15. The system of claim 13, further comprising computer-executable instructions that, when executed by the physical processor, cause the physical processor to insert the result of combining the obtained acoustic impulse response and the second audio sample into an audio track from which the input audio sample was obtained in approximately the same place in the audio track from which the input audio sample was obtained.

16. The system of claim 13, further comprising computer-executable instructions that, when executed by the physical processor, cause the physical processor to process a set of training data for training the machine learning model, wherein processing the set of training data comprises performing a Fourier Transform on each sample in a set of audio samples and performing a convolution operation between each transformed sample in the set of audio samples and each acoustic impulse response in a set of acoustic impulse responses.

17. A non-transitory computer-readable medium comprising one or more computer-executable instructions that, when executed by at least one processor of a computing device, cause the computing device to:
 obtain an audio sample from a content source;
 input the obtained audio sample into a trained machine learning model;
 obtain the output of the trained machine learning model, wherein the output is a profile of an environment in which the input audio sample was recorded;
 obtain an acoustic impulse response corresponding to the profile of the environment in which the input audio sample was recorded;
 obtain a second audio sample;
 combine the obtained acoustic impulse response with the second audio sample; and
 insert a result of combining the obtained acoustic impulse response and the second audio sample into an audio track.

18. The non-transitory computer-readable medium of claim 17, wherein the one or more computer-executable instructions include instructions that, when executed by at least one processor of a computing device, cause the computing device to insert the result of combining the obtained acoustic impulse response and the second audio sample into an audio track from which the input audio sample was obtained in approximately the same place in the audio track from which the input audio sample was obtained.

19. The non-transitory computer-readable medium of claim 17, wherein the one or more computer-executable instructions include instructions that, when executed by at least one processor of a computing device, cause the computing device to process a set of training data for training the machine learning model, wherein processing the set of training data comprises performing a Fourier Transform on each sample in a set of audio samples and performing a convolution operation between each transformed sample in the set of audio samples and each acoustic impulse response in a set of acoustic impulse responses.

20. The non-transitory computer-readable medium of claim 17, wherein the one or more computer-executable instructions include instructions that, when executed by at least one processor of a computing device, cause the computing device to combine the obtained acoustic impulse response with the second audio sample by performing a convolution operation between the acoustic impulse response and the second audio sample.

\* \* \* \* \*